April 3, 1945.　　A. H. GERHARDT ET AL　　2,372,775
AUTOMATIC IRONING MACHINE
Filed April 23, 1943　　12 Sheets-Sheet 2
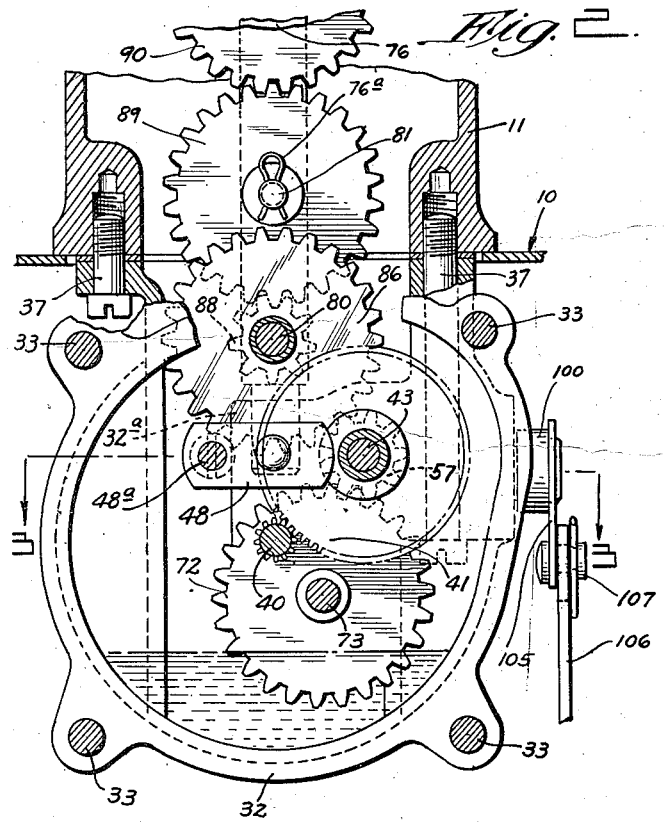
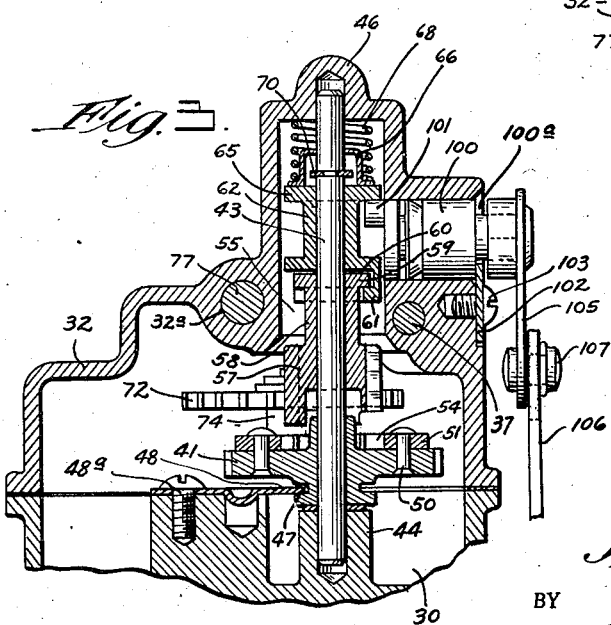
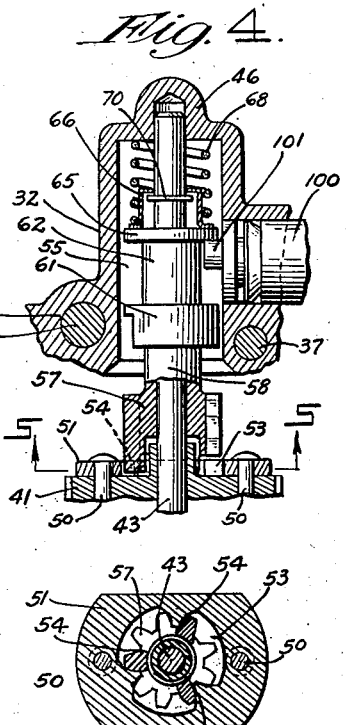
Inventors:
Andrew H. Gerhardt &
Thomas C. Maher
BY A. W. Molinare
Attorney

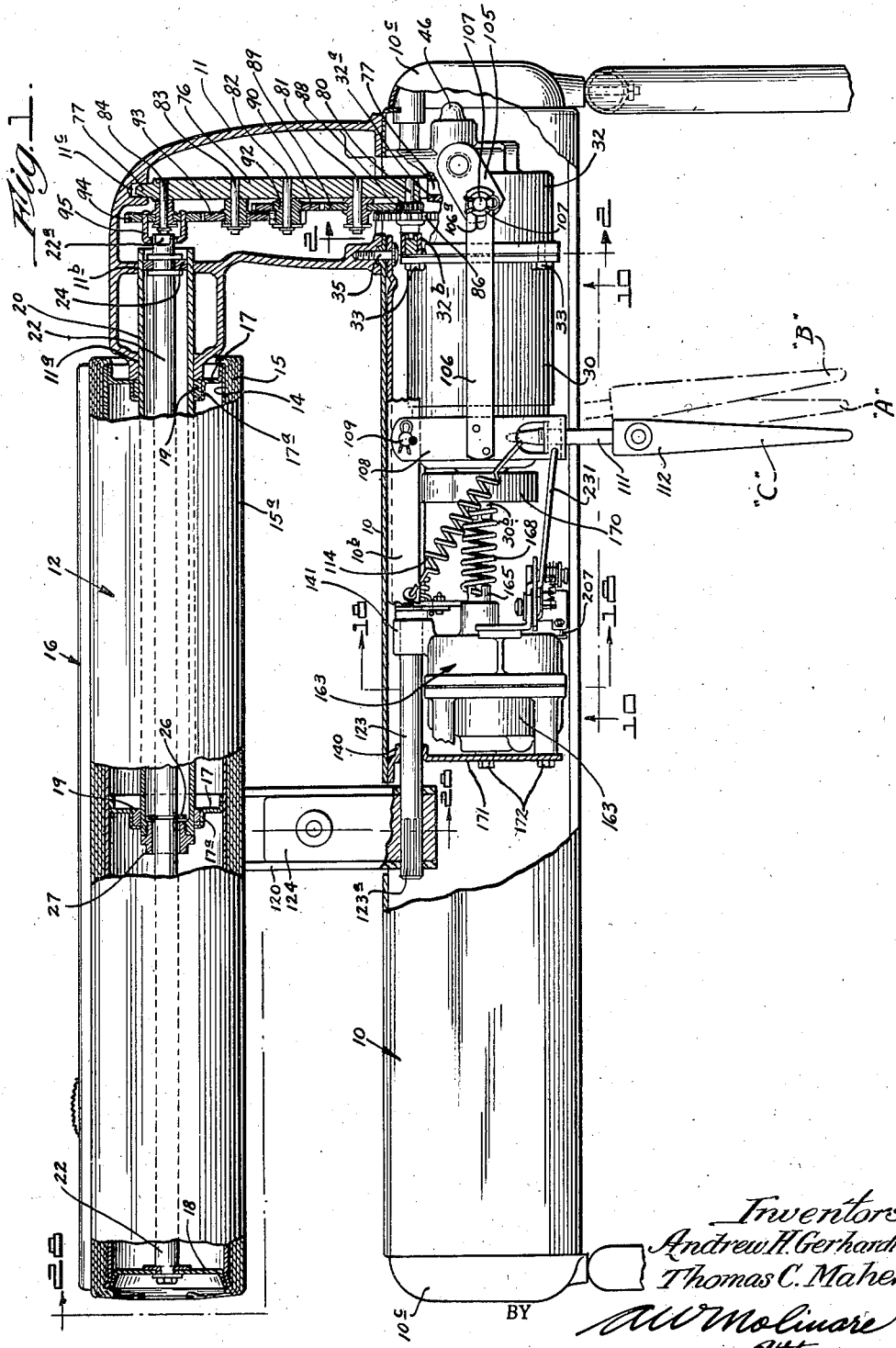

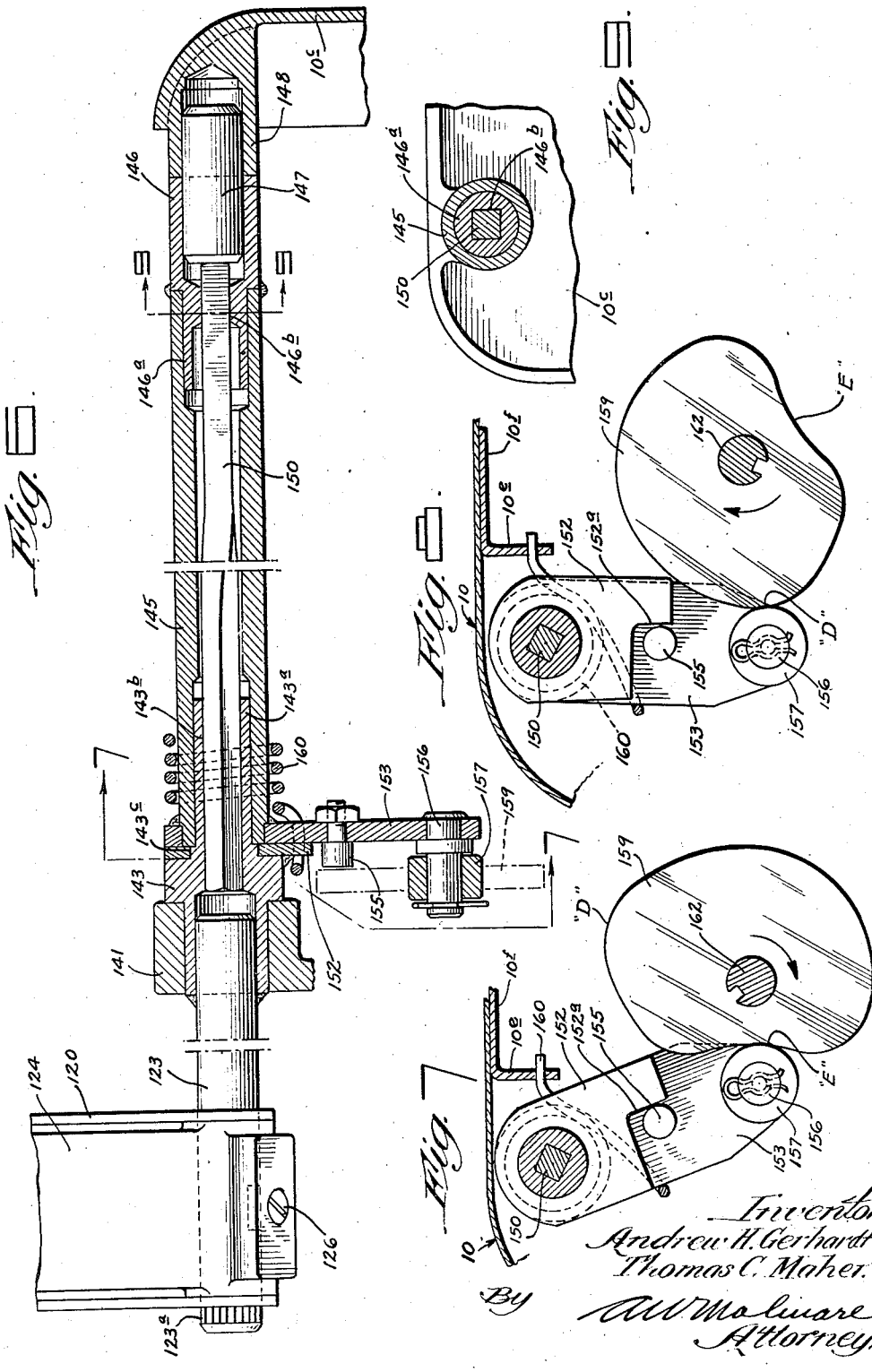

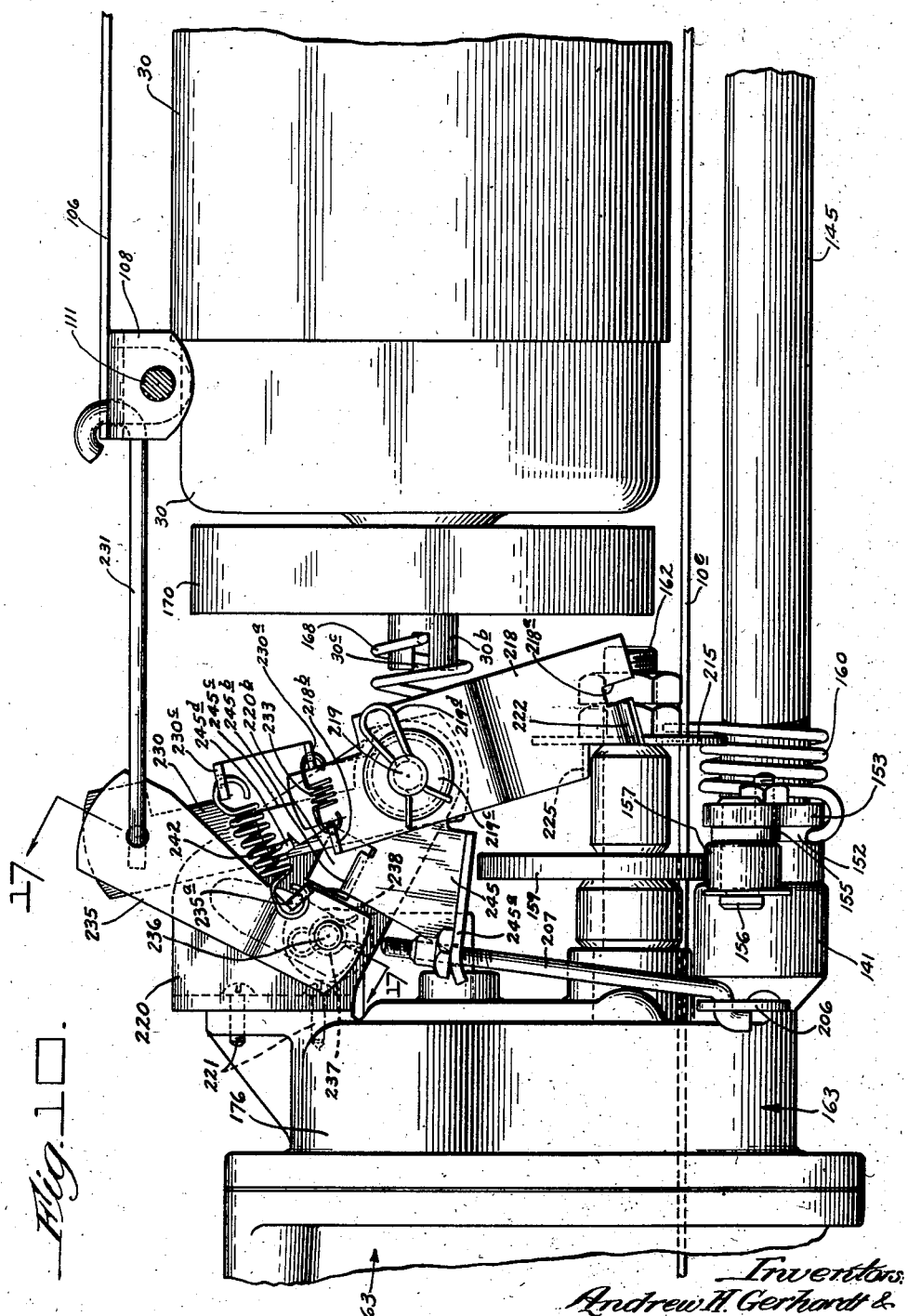

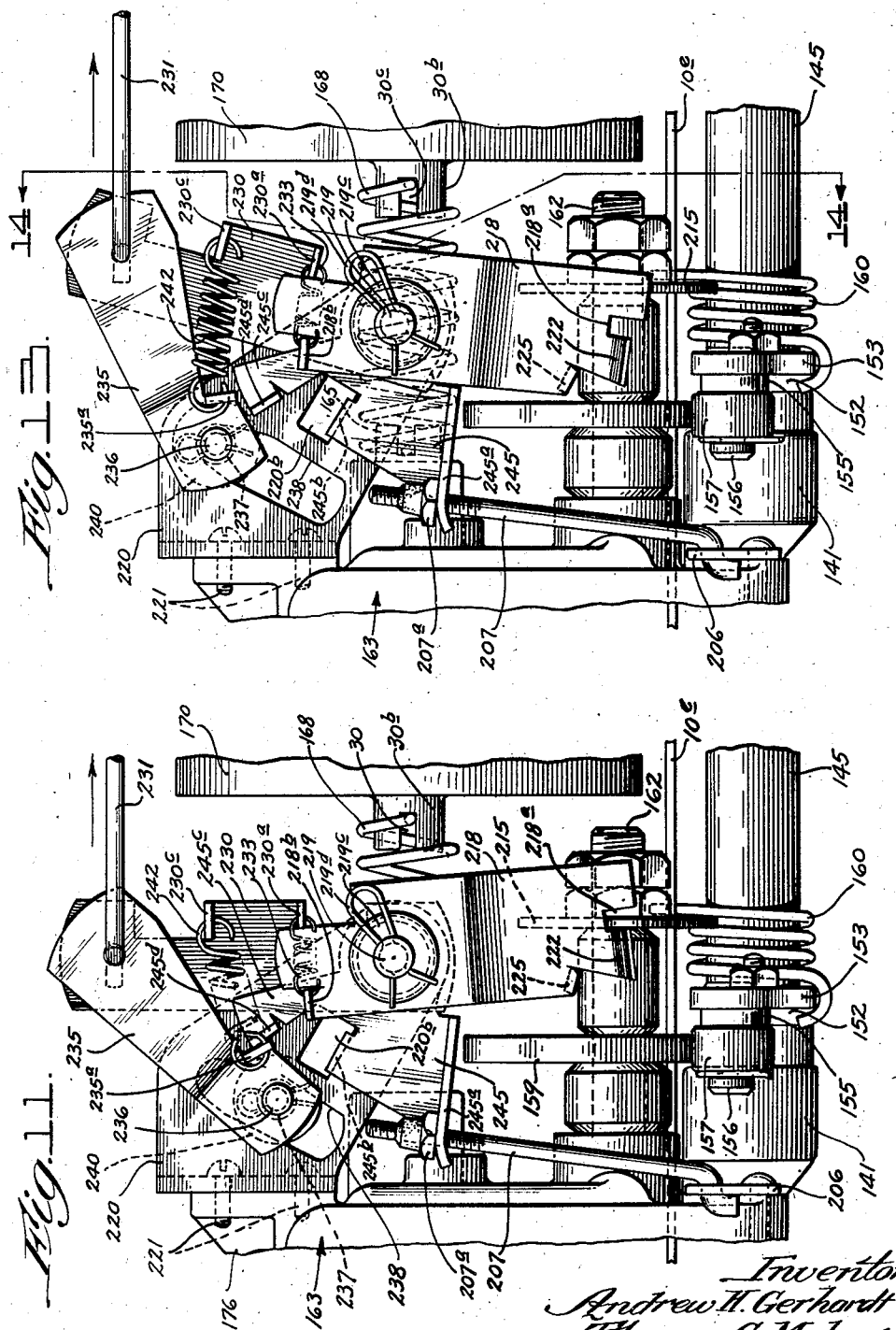

April 3, 1945.  A. H. GERHARDT ET AL  2,372,775
AUTOMATIC IRONING MACHINE
Filed April 23, 1943    12 Sheets-Sheet 6
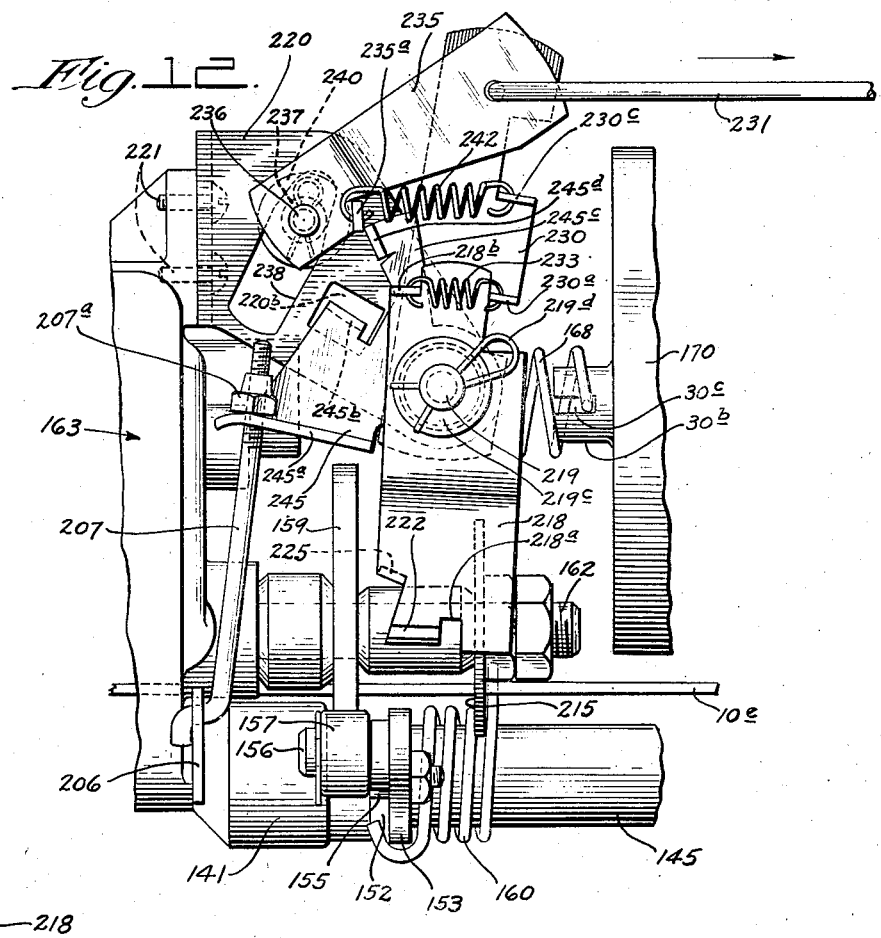
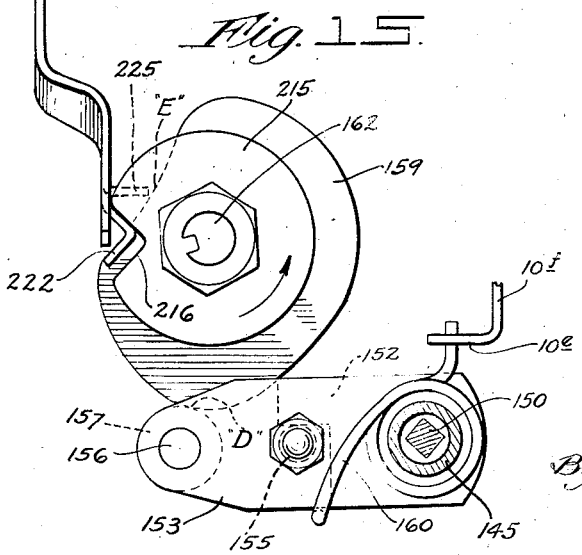
Inventors:
Andrew H. Gerhardt &
Thomas C. Maher.
By A. W. Molinare
Attorney.

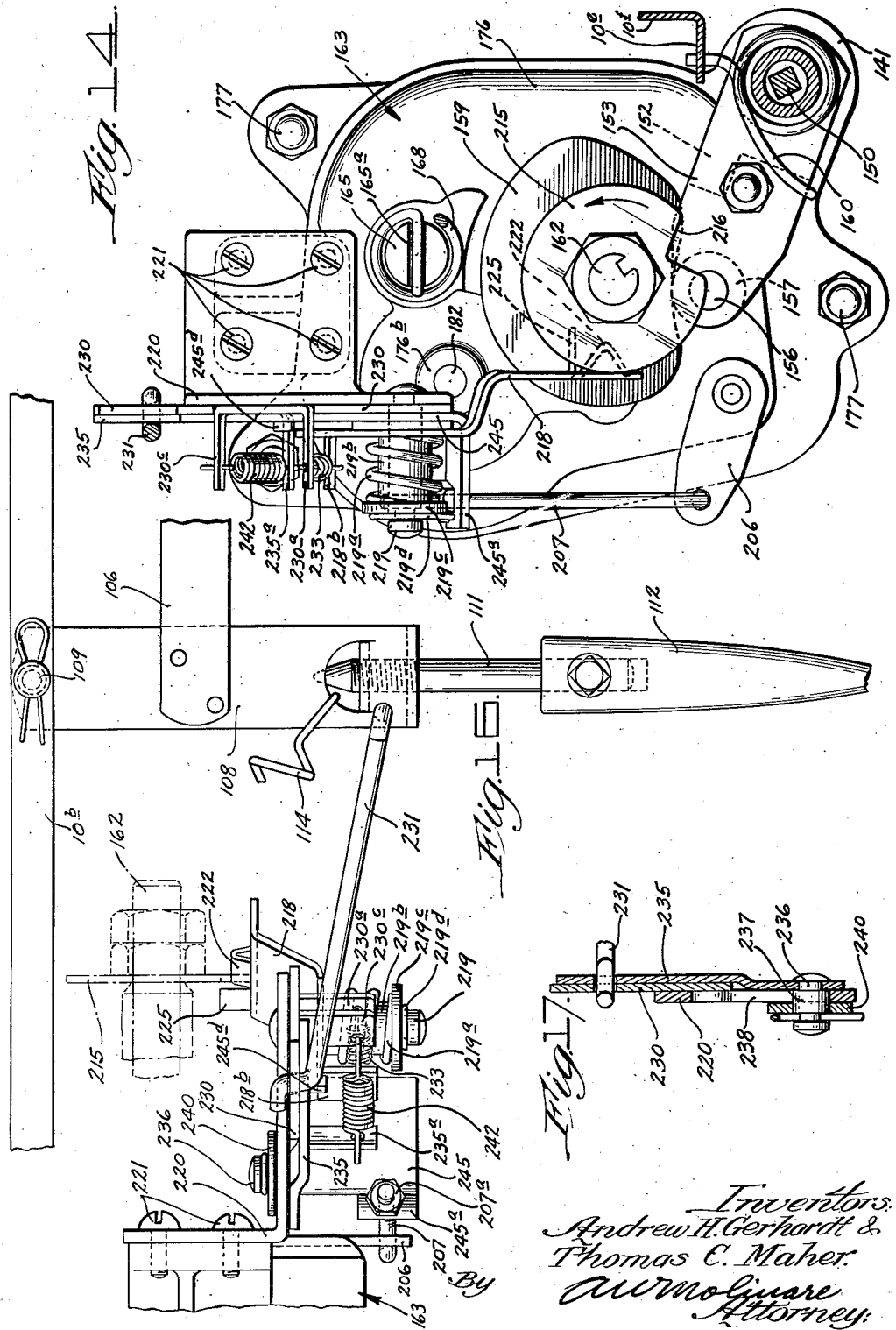

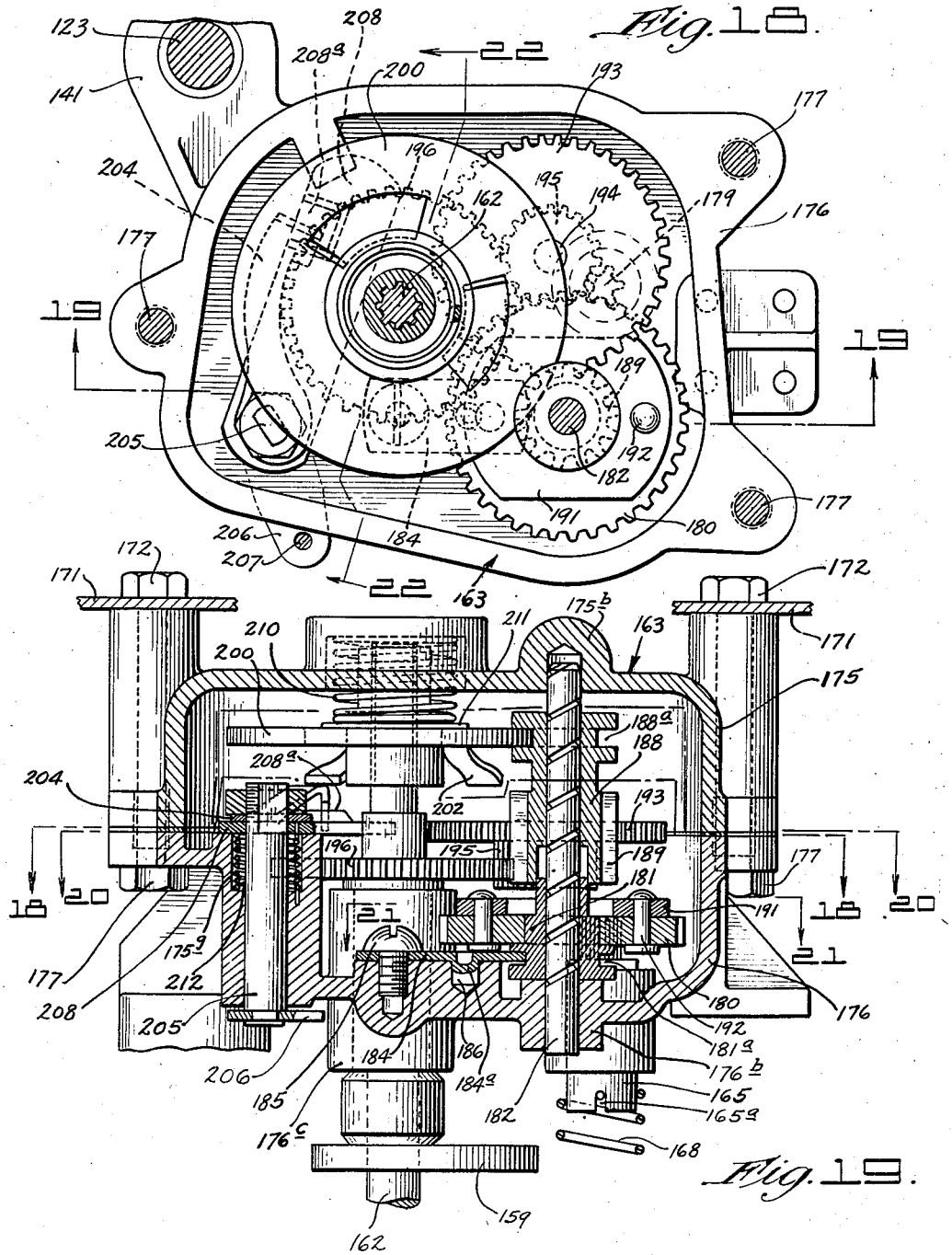

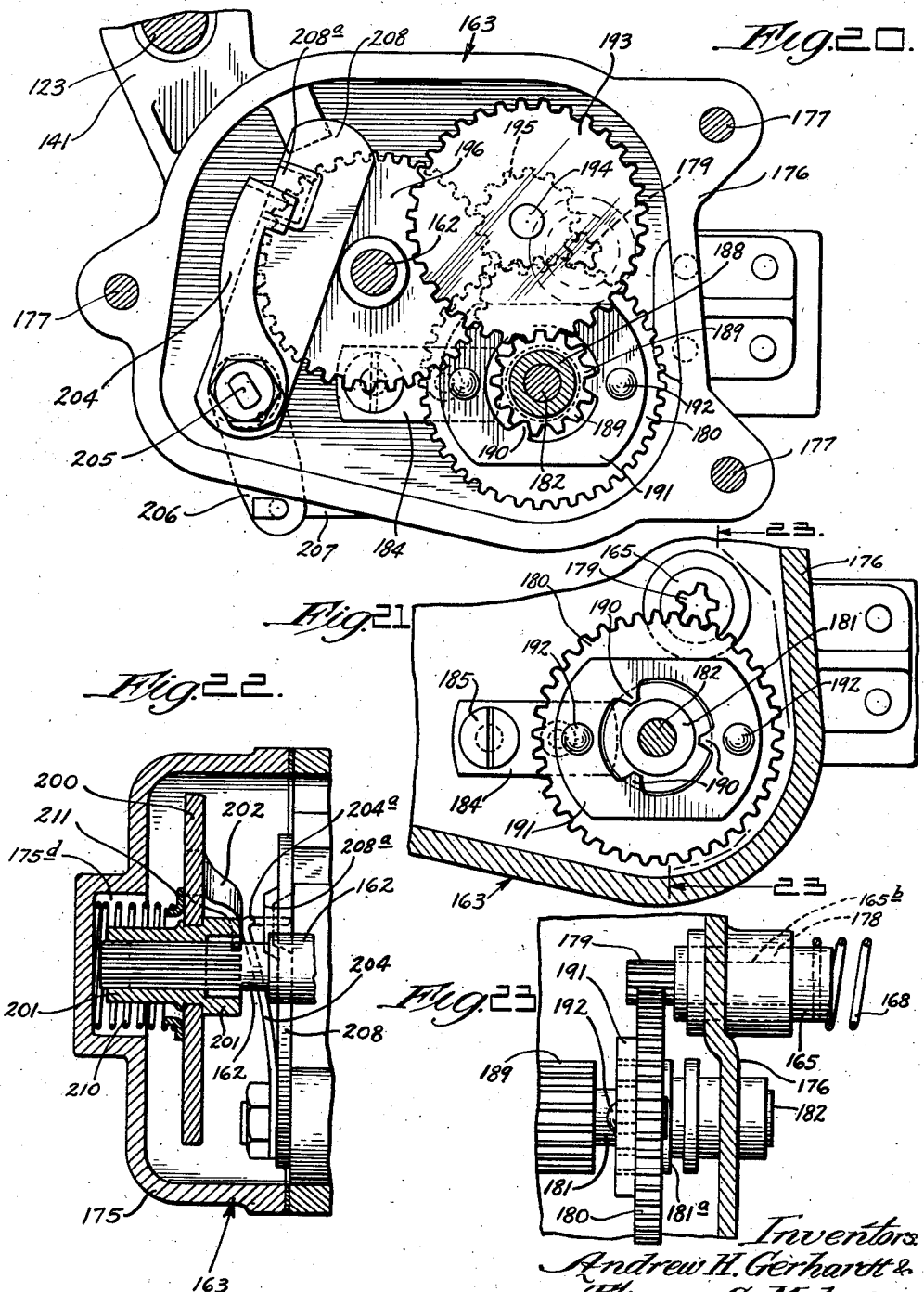

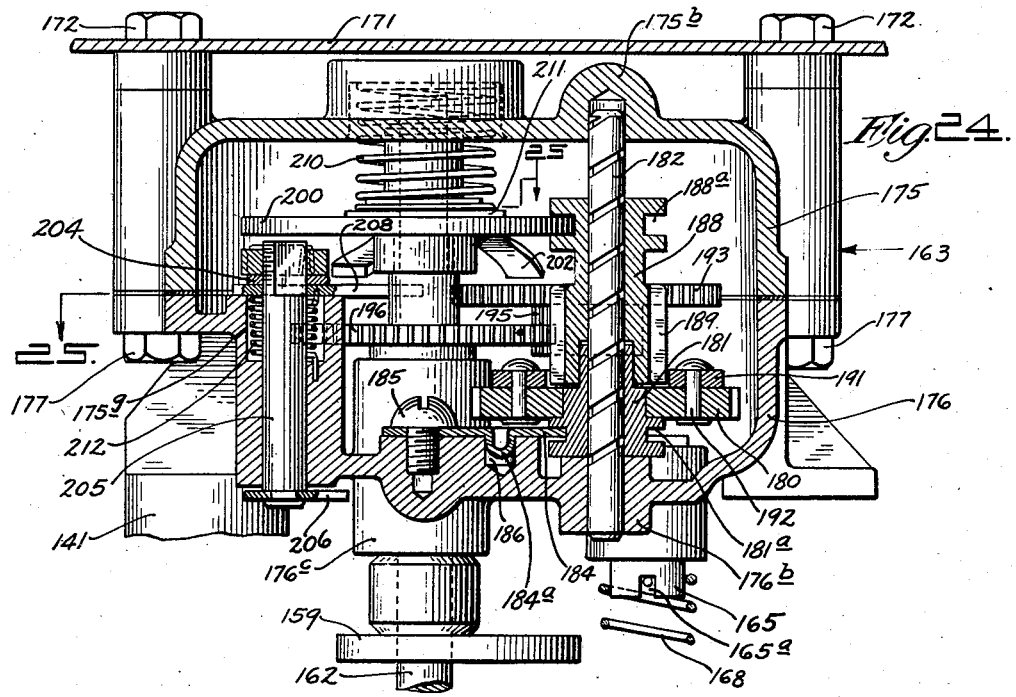
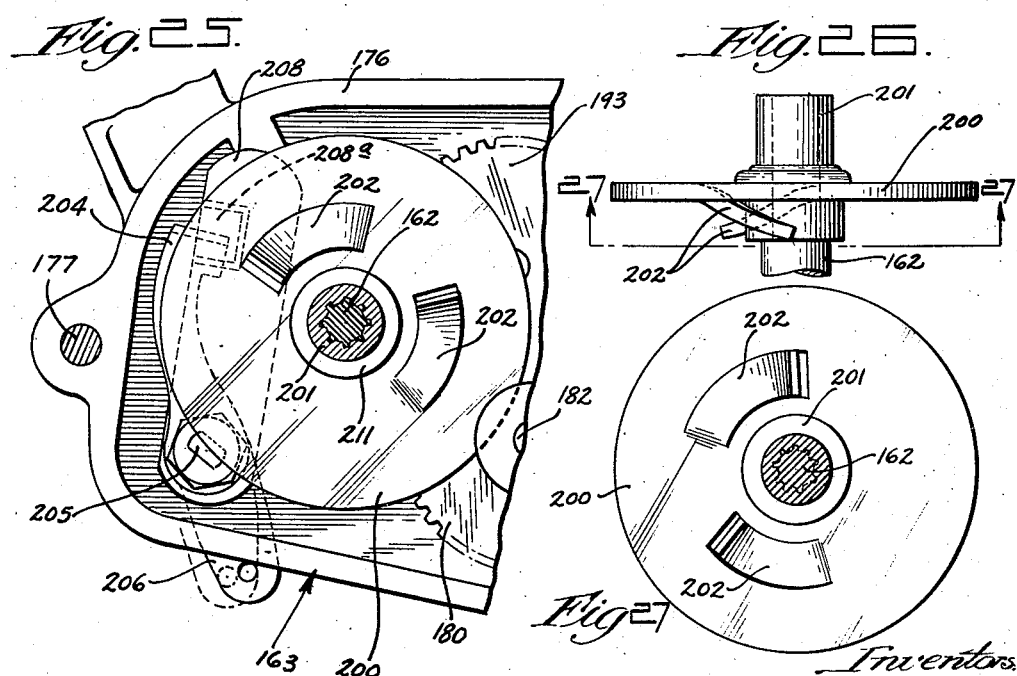

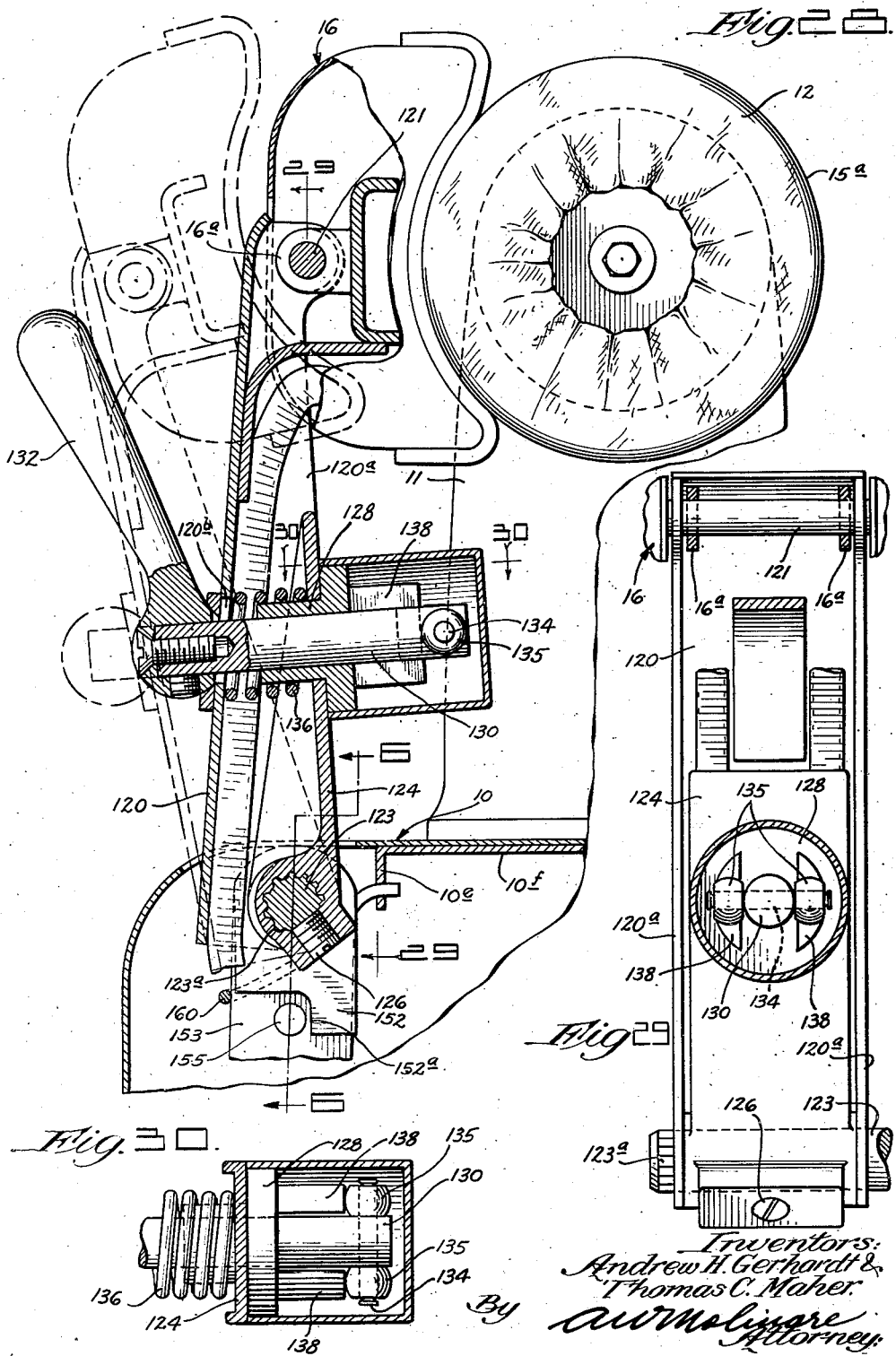

April 3, 1945.   A. H. GERHARDT ET AL   2,372,775
AUTOMATIC IRONING MACHINE
Filed April 23, 1943   12 Sheets-Sheet 12
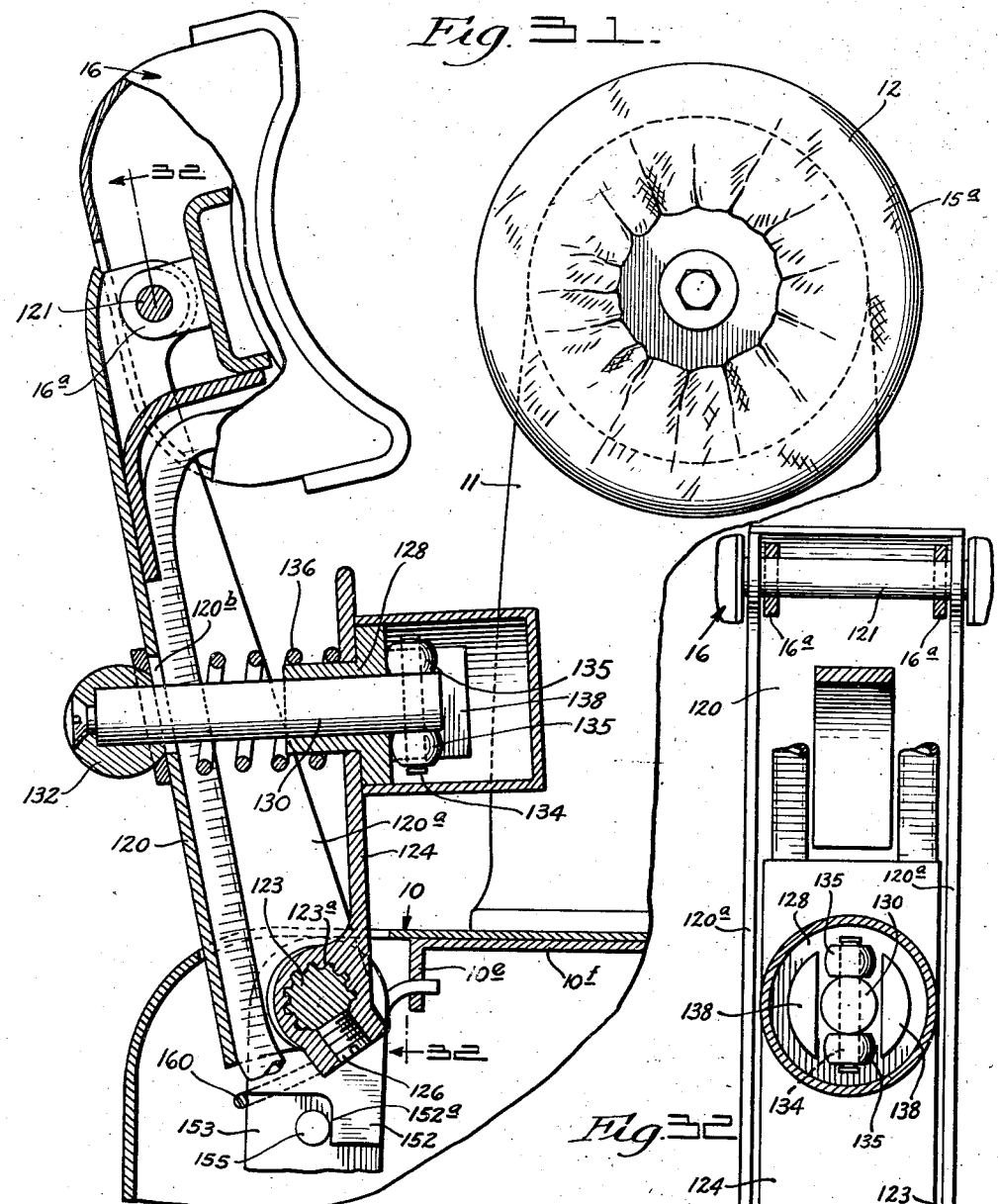
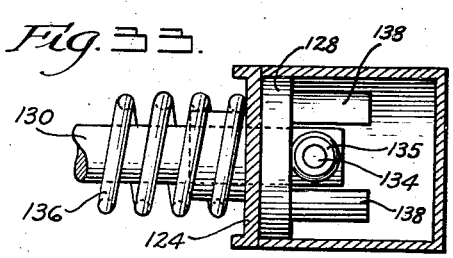
Inventors
Andrew H. Gerhardt &
Thomas C. Maher
By A.W. Molinare
A. Horney Patented Apr. 3, 1945

2,372,775

UNITED STATES PATENT OFFICE 2,372,775

AUTOMATIC IRONING MACHINE

Andrew H. Gerhardt, Skokie, and Thomas C. Maher, Chicago, Ill., assignors to Electric Household Utilities Corporation, Chicago, Ill., a corporation of Illinois Application April 23, 1943, Serial No. 484,182

20 Claims. (Cl. 38—61)

This invention relates to power operated ironing machines of the domestic type, including a rotatable roll element totally supported at one end, a cooperating electrically heated shoe element. More particularly, the present invention is directed to ironing machines of the automatic type, wherein the roll element is motor power driven, and wherein one of the elements is moved by motor power into and out of cooperating engagement with the other element. In the machine herein disclosed, the shoe element is power moved into and out of cooperative engagement with the roll.

Machines of this general class have heretofore been made in two main types, one being a portable machine of a size and weight for convenient handling and removal from place to place, or for placement for convenient use on a suitable support, such as a table or stand; and the other type being one wherein the machine proper is "built in" as a unitary part of, or fixedly connected to a stand, cabinet, or other suitable supporting structure. The machine constituting the present invention is shown mounted on, and constituting a part of a supporting frame, but it is to be understood that if desired, the machine could be readily converted for use as a portable machine, by merely relocating the main single control member.

One of the objects of this invention is to provide in an ironing machine of the character indicated, a novel drive arrangement for operating the roll and shoe independently of each other, so that at no time is the power of the motor utilized for simultaneously operating both the roll and the shoe, thus permitting the use of a relatively small and light weight motor.

Another object is to provide an improved drive mechanism for an automatic ironing machine, including separate drive connections for operating the roll and the shoe, and wherein said separate drive connections are operably connected respectively to the opposite ends of the motor shaft and are interconnected in a manner to preclude simultaneous operation of the roll and shoe.

A further object is to provide a simplified control mechanism for an automatic ironing machine, including a single control member adapted to be manipulated by the operator for selectively controlling the application of the power of the driving motor for actuating the roll and the shoe.

Still another object is to provide a novel and simplified operator actuated control mechanism, including a single control member, together with connections for selectively operating separate drive connections from the motor for actuating the roll and the shoe, and wherein the control member is adapted to be moved in a cyclic manner to cause sequential operation of the shoe and the roll, and by virtue of which operation of the single control member can selectively cause any of the following effects: first, roll rotating with shoe engaged therewith; second, roll stopped with shoe engaged therewith; and third, roll stopped and shoe disengaged therefrom.

And still another object is to provide an improved drive mechanism for an automatic ironer, which permits utilizing a motor of relatively small power and relatively light weight.

A still further object is to provide in an ironing machine of the type having driving connections from one end of a motor for rotating the roll, together with connections by virtue of which the shoe may be moved toward or away from the roll, together with a novel, unitary drive mechanism adapted to be manufactured as a separate unit, and which may be quickly and easily interconnected with the roll driving connections for converting a machine of the type having a hand-operated shoe into an automatic ironer, wherein the shoe is moved by motor power.

Other objects and advantages of this invention will be apparent from the following description, taken in connection with the accompanying drawings, in which:

Fig. 1 is a front elevational view of the ironing machine embodying the present invention, with parts broken away and shown in section to illustrate details of construction, and the controls in a position at which the shoe is engaged with the roll and the roll rotating.

Fig. 2 is an enlarged, vertical, sectional view of the drive mechanism for the roll, taken substantially as indicated at line 2—2 on Fig. 1.

Fig. 3 is a transverse, sectional view through the driving mechanism, taken substantially as indicated at line 3—3 on Fig. 2, showing the clutch parts in a position corresponding to a pressing condition of the machine, wherein the shoe is in engagement with the roll, and wherein the roll is stopped.

Fig. 4 is a fragmentary sectional view of the clutch mechanism seen in Fig. 3, showing a condition of the mechanism when the shoe is rotating and the shoe is in pressure engagement with the roll.

Fig. 5 is a transverse sectional view through the roll drive clutch, taken substantially as indicated at line 5—5 on Fig. 4.

Fig. 6 is a vertical axial section through the torque applying shoe rock shaft, taken substantially as indicated at line 6—6 on Fig. 28.

Fig. 7 is a transverse, sectional view, taken at line 7—7 on Fig. 6, showing the cam operated control for actuating the rock shaft, and associated parts shown in a position corresponding to the shoe away from the roll and the roll stopped.

Fig. 8 is a section similar to view 7, but showing the position of the parts corresponding to the shoe in pressure engagement with the roll.

Fig. 9 is a detail, tranverse, sectional view through the torque applying rock shaft, taken as indicated at line 9—9 on Fig. 6.

Fig. 10 is a bottom elevational view of the linkage and part of the control mechanism for controlling the movement of the shoe toward and away from the roll, with the parts shown in a condition of adjustment corresponding to pressure engagement of the shoe against the roll, and with the roll rotating.

Fig. 11 is a view similar to Fig. 10 showing the position of the parts corresponding to the shoe engaging the roll, and the roll stopped.

Fig. 12 is a view similar to Fig. 10 and represents an intermediate position of the parts as occurs between the position of adjustment of the parts represented in Figs. 11 and 13.

Fig. 13 is a view similar to Fig. 10 showing the parts in a position of adjustment corresponding to the shoe out of engagement with the roll, and the roll stopped.

Fig. 14 is an end elevational view of the control linkage and shoe operating mechanism, taken substantially as indicated at line 14—14 on Fig. 13, and corresponding to a position at which the shoe is away from the roll, and the roll stopped.

Fig. 15 is a detail view of the shoe operating cam and associated parts, shown in another position of adjustment from that illustrated in Fig. 14, and corresponding to a position at which the shoe is against the roll, and the roll is rotating.

Fig. 16 is an enlarged, detail view of the knee control member, shown operably connected to the linkage and driving mechanism for actuating the shoe under motor power, into and out of pressure engagement with the roll, and for driving the roll.

Fig. 17 is a detail sectional view through a portion of the control linkage, taken as indicated at line 17—17 on Fig. 10.

Fig. 18 is a transverse, staggered, sectional view, with certain parts shown in elevation, through the power drive mechanism for actuating the shoe, taken substantially as indicated at lines 18—18 on Fig. 1, and lines 18—18 on Fig. 19.

Fig. 19 is a sectional view through the shoe driving mechanism, taken substantially as indicated at line 19—19 on Fig. 18, and showing the driving clutch disengaged.

Fig. 20 is a transverse, staggered, sectional view through the shoe operating mechanism, taken substantially as indicated at line 20—20 on Fig. 19.

Fig. 21 is a fragmentary sectional view through a portion of the shoe driving mechanism, taken substantially as indicated at line 21—21 on Fig. 19.

Fig. 22 is a transverse, axial section through the outer end of the shoe driving mechanism, taken as indicated at line 22—22 on Fig. 18.

Fig. 23 is a detail view, part in section and part in elevation, taken substantially as indicated at line 23—23 on Fig. 21.

Fig. 24 is a sectional view similar to Fig. 19, showing the clutch in engaged position.

Fig. 25 is a transverse, staggered, fragmentary, sectional view through parts of the shoe driving mechanism, taken substantially as indicated at line 25—25 on Fig. 24, and showing the tripping disc and finger.

Fig. 26 is a side elevational view of the tripping disc of the shoe operating mechanism.

Fig. 27 is a face view of the tripping disc, taken as indicated at line 27—27 on Fig. 26.

Fig. 28 is a staggered, sectional view, part in section and part in elevation, through the shoe supporting arm, and associated parts, with the shoe shown in pressure engagement with the roll, and the dot line position indicating the shoe away from the roll.

Fig. 29 is a vertical, sectional view through the shoe arm support, taken as indicated at line 29—29 on Fig. 28.

Fig. 30 is a transverse, sectional view, part in section and part in elevation, through a portion of the emergency release mechanism, taken as indicated at line 30—30 on Fig. 28.

Fig. 31 is a view similar to Fig. 28 with the shoe supporting arm shown in section, and the emergency release in operated condition, disposing the shoe out of operative pressure engagement with the roll.

Fig. 32 is a sectional view through the shoe arm support in emergency released condition, taken substantially as indicated at line 32—32 on Fig. 31.

Fig. 33 is a sectional view similar to Fig. 30, but showing a portion of the emergency release in a released condition.

Referring now in detail to the drawings, the machine proper includes a supporting frame in the form of a hollow housing or base 10, of generally rectangular form, at the right hand end of which is mounted an upstanding gooseneck type housing or standard 11, which serves to enclose power drive connections to and provides support for a rotary roll 12. The housing 10, is formed mainly of sheet metal, and is of a generally inverted U-shaped cross-section, connected at opposite ends to cast members 10c. The standard 11, as shown, is in the form of a casting, and includes an upstanding, tubular portion terminating at its upper end in a horizontal extending tubular portion, and the said upstanding and horizontal portions being joined together by suitably curved surfaces. The standard, 11, is of relatively small cross-sectional dimension, and preferably, is approximately equal to, or less than, the external diameter of the roll 12, taken at any transverse plane throughout the entire length of the standard.

The roll 12, includes a tubular metal body 14, around which is wrapped suitable padding material as indicated at 15, and the latter in turn is surrounded by a fabric wrapper or cover 15a. The roll extends horizontally and in parallel spaced-apart relation to the top of the base 10, and is totally supported at one end by the horizontal portion of the gooseneck standard 11, in a conventional manner. Cooperating with the roll 12, is a shoe 16, which is preferably electrically heated in a manner well understood in the art. The operating face of the shoe is shaped to the contour of the padded roll 12, and is mounted for movement into and out of pressure engagement with the roll, as will hereinafter be described.

The metal tubular body 14, of the roll is provided at opposite ends, and at substantially centrally of its length, with dish-shaped stampings 17 and 18. The dish-shaped stampings 17, are provided with centrally offset portions 17a, formed to support bearings 19, which provide journal support for the roll on a metallic tube 20, which is disposed axially within, and terminates slightly beyond the middle of the length of the roll. As may be seen at the right-hand portion of Fig. 1 of the drawings, the tube 20, extends beyond the roll into the gooseneck standard 11, and is interfitted into two spaced-apart bearings 11a and 11b, in said horizontal portion of the standard 11. By virtue of this construction, the tube is adequately supported in the standard 11, and thus provides journal support for the roll 12. The dished member 18, at the free or outer end of the roll is formed to provide an interlocking driving connection with a roll drive shaft, 22, which extends centrally and longitudinally of the roll through the tube 20, and having an end portion extending into the interior of the gooseneck standard 11, for connection to the driving mechanism, hereinafter described, and which serves to impart driving rotary motion to the roll 12. The said end portion of the shaft within the standard 11, is provided with an oil seal 24, in engagement with the inner wall of the tube 20, and said shaft is secured in proper position with respect to the roll 12 and tube 20 by means of a spring collar 26, mounted on the shaft, adjacent the outer end of said tube 20. Threaded into the outer end of the tube 20, is a nut 27, adapted to serve as an abutment shoulder for the collar 26, to preclude outward movement of the shaft with respect to the tube 20 and the standard 11.

*Roll driving mechanism*

The driving mechanism for the roll 12, includes an electrically driven motor 30, disposed within the sheet metal supporting base 10, adjacent the right hand end, and having its housing securely connected to a cast housing member 32, by means of machine screws 33. The housing 32, serves to enclose speed reducing mechanism and the lower portion of transmission mechanism, together with clutch mechanism disposed in registration with the upright leg portion of the gooseneck standard 11, which mechanisms serve to supply power for operating the roll. The upper end of the cast housing member 32, is formed with an opening disposed in registration with the opening formed at the lower end of the standard 11, which in turn is in registration with a similar opening formed in the top of the sheet metal housing 10, as seen in Figs. 1 and 2 of the drawings. The gooseneck standard is secured to the top of the support housing by means of three circumferentially spaced-apart machine screws 35, and the cast housing member 32, is rigidly connected to the lower end of the gooseneck standard 11, by means of two machine screws 37, one of which is of substantial length as seen in Fig. 2 of the drawings.

In the construction illustrated, power take-off driving connections are provided at opposite ends of the motor shaft, and one of said connections serves to provide power for operating the roll and the other of said connections serves to supply power for actuating the shoe 16, for moving it under power into and out of cooperating engagement with the roll 12. The right hand end of the motor shaft is provided with a driving pinion 40, as seen in Fig. 2 of the drawings, meshed with a gear 41, loosely mounted on the adjacent end of a horizontally extending shaft 43, one end of which shaft is press-fitted into a boss 44, constituting a part of the motor housing, and the other end of said shaft being slip fitted in a boss 46, formed at the outer end of the cast housing member 32, as seen in Fig. 3 of the drawings. The gear 41, has its hub provided with an annular groove 47, into which projects the edge of a retaining plate member 48, secured to a boss on the adjacent end of the motor housing by screws 48a. Said plate thus serves to preclude axial movement of the gear 41, on its shaft 43. Mounted on the outer face of the gear 41, by means of rivets 50, is a clutch plate 51, formed with a central opening 53, the contour of which is such as to provide three circumferentially spaced-apart driving teeth 54.

The driving mechanism for the roll is under control of a clutch mechanism which in turn is subject to interlocking control with the driving mechanism for power moving of the shoe into and out of engagement with the roll, as will hereinafter be described. The clutch mechanism is carried on the shaft 43, within a chamber 55, formed in the housing member 32, as seen in Figs. 3 and 4 of the drawings. Cooperating with the clutch plate 51, is an axially shiftable pinion 57, slidably mounted on the shaft 43. Said pinion is formed with three equidistant, circumferentially spaced teeth of greater length than the other teeth of said pinion, as clearly seen in Fig. 4 of the drawings, so that when said pinion is axially shifted into operative engagement with the clutch plate 51, the three long teeth are moved into cooperating relation to the driving teeth 54, of the clutch plate 51, and by virtue of which rotary motion is thus transmitted to the pinion 57. The purpose of forming the clutch plate in the manner indicated, for cooperating with the three elongated or extended teeth on the pinion, is to avoid chattering and noise, and to insure quick and easy entrance of the said elongated teeth into the opening in the clutch plate, intermediate its teeth 54, and thereby obtain substantially instantaneously clutching and driving relation of the pinion and the clutch plate. Said pinion 57, at the end opposite said teeth, is formed with an elongated hub, 58, the extreme end of which is formed with an enlarged annular flange 59, adapted to be seated into an anular socket 60, formed in an enlarged flanged shoulder 61, of a clutch shifting collar 62, which likewise is slidably mounted on the shaft 43. The shoulder 61, of said collar is provided with an opening of substantial angular extent to permit insertion of the flange 59, of the pinion 57, into the socket portion 60. The clutch pinion 57, and the shifting collar 62, together with shaft 43, are assembled together by first seating the flange 59, of pinion 57, into the socket in the shoulder 61, of the collar, and then extending the shaft 43, therethrough, so as to maintain the parts in coupled relation. This connection serves to reduce transmission of rotary motion from the pinion 57, to the collar 62, and thereby effects a reduction in strain and wear upon the element employed for shifting the collar 62.

Disposed in abutting relation to the outer end of a shoulder 65, formed at the outer end of the clutch shifting collar 62, is a flanged thimble 66, surrounded by a coil spring 68, reacting against the flange of the thimble and against the end of the chamber 55 in the housing member 32, and thus serves to urge the clutch shifting collar 62, together with the clutch pinion 57, in an axial direction toward the motor. The extent of such inward axial movement, under influence of spring 68, is limited by a crimped washer 70, mounted in an annular groove on the shaft 43, adjacent the outer flange 65, of the shifting collar, in a position to be engaged by the closed end of the thimble 66.

Meshing with the underside of the clutch pinion 57, is an idler gear 72, freely mounted on a stud 73, carried in a boss 74, formed as an extension of the motor housing. The lower portion of the housing member 32 is filled with suitable lubricant, preferably in the form of oil, the level of which desirably, should be sufficiently high so that the idler gear 72, continuously travels through the bath of oil and picks up the same, and transmits it to the clutch pinion 57, which in turn transmits the lubricant through the train of gears, constituting the power transmission driving mechanism for operating the roll, hereinafter described, and thus serves as the medium for lubricating such mechanism.

The gearing thus far described pertains to a speed reduction from the motor 30, to the driving pinion 57, when the latter is engaged with the clutch plate 51. A further reduction in speed is obtained by mechanism which will now be described, and which also serves as the means for transmitting motion to drive the roll 12. This mechanism is in the nature of a unitary gearing assembly, and includes a vertically disposed mounting bar 76, extending upwardly into the upright hollow leg portion of the gooseneck standard 11, with the lower portion of the bar disposed in the housing member 32, as seen in Fig. 1 of the drawings. The opposite ends of the mounting bar 76, are reduced as indicated at 77, to provide trunnions, and the lower trunnion of said bar is seated in a socket 32ª, formed in the housing 32, while the trunnion at the upper end of said bar is seated in a socket 11ᶜ, formed in the interior of the upper end of the standard 11, as seen in Fig. 1 of the drawings. Projecting laterally from said bar, and rigidly secured thereto, are vertically spaced-apart horizontally extending stub shafts 80, 81, 82, 83, and 84.

The outer end of the stub shaft 80, is fitted in a socket 32ᵇ, supported in a boss on the inner wall of the housing member 32, and serves to maintain the mounting bar 76, in aligned vertical position with all of its stub shafts disposed in proper aligned relation with respect to the driving pinion 57. Loosely mounted on the stub shaft 80, is a gear 86, meshed with the clutch pinion 57, and rigidly attached to the gear 86, is a pinion 88, with which is meshed a gear 89, loosely mounted on the stub shaft 81. Loosely mounted on the stub shaft 82, is another gear 90, which in turn is meshed with the gear 89, and rigidly attached to the gear 90, is a pinion 92, which is meshed with a gear 93, loosely mounted on stub shaft 83, and this latter gear 83, is meshed with a gear 94, loosely mounted on the uppermost stub shaft 84. These gears are confined on their respective stub shafts in any convenient manner, and as herein shown, by means of spring U-shaped clips 76ª. Rigidly connected to the uppermost gear 94, of the gear train, is a coupler member 95, of thimblelike formation, the closed end of which projects outward, and is formed with a socket in the nature of a slot for receiving a tang-shaped terminal 22ª, formed on the adjacent end of the roll drive shaft 22, as seen in Fig. 1 of the drawings. It will now be apparent that when the clutch pinion 57, is in cooperating engagement with the clutch plate 51, power and motion is transmitted through the gear train described, to the roll drive shaft 22, for effecting rotation of the roll 12. The drive mechanism above described is of relatively simple and economical form, which lends itself to convenient manufacturing by virtue of which the gear train may be assembled as a unit upon the mounting bar 76, prior to final assembly in the machine, and further permits utilizing a supporting standard 11, of relatively small cross-sectional dimensions.

The shifting of the clutch pinion 57, by the collar 62, for controlling the drive connections to the roll 12, is subject to the operation of control apparatus, which is in the nature of a dual control, hereinafter described, which also serves to control in proper sequence, the application of power for actuating the shoe into and out of cooperative engagement with the roll. For shifting the collar 62, axially in controlling the operation of the clutch, there is employed a cylindrical plug or body 100, rotatably mounted in a tubular bearing provided in the housing member 32. The inner end of the plug is provided with a nubbin 101, positioned to be moved into cooperating engagement with the flange shoulder 65, of the clutch collar 62. The plug body 100, is retained in position in the housing 32, by a retaining plate 102, secured by screws 103, to the housing member 32, with an edge portion of the plate projecting into an annular groove 100ª, formed in the plug body.

Rigidly connected to the outer end of the plug body is a crank arm 105, in the form of a link, the outer end of which is pivotally connected by a pivot pin 107, by a lost motion connection to one end of an operating bar 106. The operating bar 106, is rigidly connected at its opposite end to a depending lever 108, pivotally connected at 109, to a frame member 10ᵇ, of the main supporting housing 10. The lower end of the lever 108, has connected thereto, a movable control member comprising a rod 111, threaded into the lower portion of the lever 108, as seen in Fig. 16 of the drawings, and rigidly connected to the lower end of the rod 111, is a depending, flattened, knee operated member 112. Referring now to Fig. 1 of the drawings, the knee operating member 112, normally in the starting of the machine, is in the position as indicated by dot and dash lines at "A," and is adapted to be first moved to the right to the position indicated by dot and dash lines at "B," and is then adapted to be returned by the action of a coil spring 114, connected to the lower end of the depending lever 108, and to the frame member 10ᵇ, to either the position indicated by dot and dash lines at "A," or to the full line position indicated in full lines in the drawings, which position, for convenience, is indicated at "C." When the knee lever member 112, is moved from position "A" to "B," the operating bar 106 is moved about the pivot 109, so that the outer end of said bar moves in an upward direction, and by reason of the pivot pin 107, causes the crank arm 105, to move in clockwise direction, rotating the plug body 100, thereby causing the nubbin 101 to react against the flange 65, of the collar 62, and thereby shift the collar and the pinion 57, outwardly along the shaft 43, to disengage the pinion 57, from the clutch plate 51. This movement takes place against the reactive force of the coil spring 68 and spring 114. In this condition of adjustment, the driving connections to the roll are broken by disengagement of the clutch, which comprises the three elongated teeth of the pinion member 57, and the clutch plate 51, and the position of the clutch parts is then indicated in Fig. 3 of the drawings. When the knee operating lever 112, is permitted to return to the position indicated at "A" by spring 114, it is to be understood that the connections of the parts are such that the movement of the bar 106, and the crank arm 105, causes the clutch to remain disengaged, so that the drive connections to the roll 12, still remain inoperative. When, however, pressure against the knee control member 112, is further relieved, said member assumes the full line position indicated at "C" in Fig. 1 of the drawings, under influence of the spring 114, at which position the operating bar 106, has moved the crank arm 105, in counter-clockwise position, and the plug 100, rotated sufficiently to move the nubbin 101, to relieve its pressure engagement with the shoulder 65, of the shifting collar 62, so that the spring 68, is free to move said collar 62, together with pinion 57, to dispose the elongated teeth of the pinion into meshing engagement with the clutch plate 51, at which time the driving connections are established for imparting and transmitting rotary motion to the roll 12. The purpose of the slot 106ª, in bar 106, is to provide freedom of movement between the outer end of the operating bar 106 and the pivot pin 107, of the crank arm 105, to accommodate the shifting relationship of the pin 107, when the crank arm 105, is moved upwardly in clockwise direction by the operating bar 106, incident to movement of the knee operating member 112, from the full line position indicated at "C," to either the positions indicated at "A" or "B," or when the knee operating member is moved from the dot and dash outlined position "A," to the position "B."

It is to be understood that incident to such controlling movement by the knee operating member 112, there is also employed other control apparatus by virtue of which the motor power, as will hereafter be described, is employed for moving the shoe 16, under power, into or out of operative engagement with the roll 12.

*Shoe supporting structure*

The shoe 16 is supported by a two-piece arm structure, including a main upright member 120, of U-shaped cross section, pivotally connected at its upper end by a pivot pin 121, to a pair of transversely, spaced-apart ears 16ª, on the back of the shoe 16, and the lower end of the arm 120, has its two side members 120ª, journal supported on a rock shaft 123. Fixedly mounted on the rock shaft, intermediate the side members 120ª, of the arm 120, is an upwardly extending auxiliary arm 124, adapted to be normally latched to the arm 120, as seen in Fig. 28 of the drawings, by means of an emergency release mechanism to be presently described. The lower end of the auxiliary arm 124, is provided with a splined bore for seating upon the splined outer end portion 123ª, of the rock shaft 123, and is fixedly secured thereon against axial movement, by means of a set screw 126.

The emergency release mechanism, which normally latches the arm members 120 and 124 in operative relation to each other, as seen in Fig. 28 of the drawings, includes a flanged bearing member 128, fitted into an aperture in the web portion of the arm 124, with the flange thereof, abutting against the outer surface of said arm. Slidably mounted in the bearing 128, is a stub shaft 130, one end of which projects through an enlarged opening 120ᵇ, in the web portion of the arm 120, and rigidly attached to the outer end of said stub shaft is a handle 132.

The other end of the stub shaft 130, carries a transversely extending pin 134 on each end of which is journaled a roller 135, disposed on opposite sides of the stub shaft 130. A coil spring 136, surrounds the bearing 128, and abuts at opposite ends against the adjacent surfaces of the webs of the respective arm members 120 and 124, tending to urge the arms apart. Normally, when the handle 132 is in the position seen in Fig. 28 of the drawings, the coil spring 136, is compressed, and the rollers 135 are disposed in abutting relation to the ends of a pair of spaced apart projections 138, extending rearwardly from the flanged portion of the bearing 128. The emergency release may be readily manipulated by turning the handle 132 through an arc of approximately 90 degrees, from the position seen in Fig. 28 to the position seen in Fig. 31, in which position the rollers 135, are disengaged from the projections 138, and disposed in a vertical plane, as seen in Figs. 31 and 32 of the drawings, in registration with the space between the projections 138. In such position of the parts, the spring 136, causes separation of the arm members 120 and 124, to the position as seen in Fig. 31 of the drawings. To relatch the arms in operative relation, the spring 136, is compressed simultaneously with moving the arm 120, into proper relation to the arm member 124, and disposing rollers 135, beyond the ends of the projections 138, at which time the handle 132, may be rotated approximately 90 degrees, so as to dispose the rollers 135, in abutting relation to the ends of the projections 138, which serves to latch the arms in operative position. The purpose of the emergency release above described, as is well known, is to permit instantaneous disengagement of the shoe from the roll in the event that the electrical current is suddenly cut off. Such a release is particularly important to insure against possible damage to articles in process of being ironed, in the event that the motor of the machine is suddenly stopped by a break in the current supply line.

The shoe rock shaft 123, as may be seen in the drawings, is disposed in a horizontal plane, and is journal supported by two transversely, spaced apart bearings 140 and 141. In the construction illustrated in the drawings, the shoe rock shaft proper is of relatively short length, and the shaft is desirably preloaded with spring pressure, so as to permit utilizing a motor of relatively small size and low power requirements. Referring now to Fig. 6 of the drawings, it will be seen that the end of the rock shaft, opposite the end supporting the shoe arm, is rigidly attached, such as by welding, to a bearing plug 143, which in turn is journaled in the bearing 141. The outer end of the bearing plug 143, includes a tubular extension 143ª, providing journal support for one end of an elongated tubular body 145. The opposite end of the tubular body is telescoped over, and rigidly secured to a tubular extension 146ª, of a plug 146, as by welding. The outer end of the plug 146, has press-fitted therein, a cylindrical plug 147, having a portion extending beyond the end thereof, and journaled in a bearing 148, formed as an integral part of the adjacent end casting member 10ᶜ, of the main supporting housing 10. The interior of the extensions 143ª, of the plug 143 and 146ᵃ of the member 146, are provided with bores 143ᵇ and 146ᵇ respectively, of rectangular formation, for accommodating therein, the ends of a torsion rod 150, of square cross section. The body 143, is shouldered at 143ᶜ, on which is seated an arm 152, rigidly connected thereto, as by welding. The adjacent end of the tubular body 145, is likewise shouldered, and has rigidly seated thereon, as by welding, a downwardly depending operating arm 153. Thus it will be seen that a tendency to rotate the arms 152 and 153 in opposite directions will result in twisting and building up of torque in the rod 150. By virtue of this construction, the arm 153, in effect is rigidly attached to the right hand end of the torsion rod 150, and the arm 152, is in effect, connected to the left hand end of the torsion rod. In the assembly of the parts, the two arms, 152 and 153, are initially disposed at an angle to each other, and are then moved relatively to each other until they assume a position substantially as seen in Fig. 8 of the drawings, in which condition the rod 150, has been twisted as seen in Fig. 6, so as to preload the torsion rod. The torsion rod in preloaded condition is maintained in such condition by the provision of a stop pin 155, on the arm 153, adapted to be engaged by an abutment shoulder 152ᵃ, of the arm 152, to preclude rotation of said arm 152, in a clockwise direction with respect to the arm 153, as seen in Fig. 8 of the drawings. The lower end of the operating arm 153, is provided with a stud 156, carrying a roller 157, disposed in a position to be engaged by a main operating cam 159 adapted to be power driven by the motor, as will hereinafter appear.

Thus, it will be apparent that with the torsion rod 150, in preloaded condition, and due to the abutment shoulder 152ᵃ, of the arm 152, engaging the stop pin 155, the entire assembly attached to the rock shaft 123, in effect is adapted under certain conditions to move substantially as a single unit in the process of moving the shoe 16, toward and away from the roll 12. In the position of the parts seen in Fig. 7 of the drawings, the power driven cam 159, is disposed in relation to the roller 157, corresponding to a position at which the shoe 16, is caused to assume a position out of engagement with the roll, as seen in dotted lines in Fig. 28. To insure that the shoe moves to such position when the cam assumes the position seen in Fig. 7, we provide a coil spring 160, surrounding the tubular body 145, and having one end surrounding the rear edge of the arm 153, and the opposite end of the spring being anchored in a depending flange 10ᵉ, of a re-enforcing channel 10ᶠ, secured to the under side of the top of the sheet metal housing of the main supporting housing 10.

*Shoe operating mechanism and interlocking control with roll driving mechanism*

The shoe operating cam 159, is fixedly secured on a power driven shaft 162, associated with driving mechanism mounted within a cast housing 163, which mechanism in turn is operably connected with and driven by the rear end extension 30ᵇ, of the shaft of the motor 30. Said mechanism includes a main driven shaft 165, disposed in substantially axial alignment with the rear extension 30ᵇ, of the motor shaft, and the said ends of said shafts are slotted as indicated at 165ᵃ, and 30ᶜ respectively, to provide anchorage for the opposite ends of a coil spring 168, which constitutes a flexible coupling for transmitting power from the motor 30, to the driving mechanism within the housing 163. The use of a coil spring as a coupling has two main advantages, in that it permits accommodation to slight misalignment of the shafts being coupled, and further, in that it permits the motor to gradually assume the full load. The drive connections from the rearward end of the motor are, as will hereinafter appear, utilized to supply power for moving the shoe 16. Because the shoe is imparted oscillating motion by the cam 159, it will be apparent that when the high point "D," or peak of the cam is in engagement with the roller 157, the maximum load is then being imposed upon the motor 30. In order to utilize a motor of minimum size and power requirements, we employ a fly wheel 170, on the rear extension 30ᵇ, of the motor shaft. Said wheel tends to cause the armature of the motor to continuously rotate, so that as the cam 159 is rotating in process of moving the shoe into engagement with the roll, the fly wheel effect will provide the additional force necessary, when using a small size motor to cause the peak or high point of the cam to cam against roller 157, to cause the shoe to exert pressure against the roll. In this connection, it will also be noted that the contour of the cam 159, is such that the cam surface, with respect to the axis of the shaft 162, increases gradually, a comparatively small amount, throughout a range of approximately 180 degrees, so that the load imposed upon the motor in the movement of the shoe is gradual, and permits utilizing a motor of relatively small power size.

The cast housing 163, which contains the drive mechanism for operating the shoe, includes the rock shaft bearing 141, as an integral part thereof, and the housing proper is rigidly secured in position within the main housing 10, to a depending plate 171, by means of screws 172. The upper end of the plate 171, has the rock shaft bearing 140, formed as an integral part thereof, as seen in Fig. 1 of the drawings.

The housing 163, is composed of two main cast members, 175 and 176, adapted to be connected together by machine screws 177. The driven shaft 165, of the driving mechanism is in the form of a headed element, and includes a portion of reduced diameter as indicated at 165ᵇ, as clearly seen in Fig. 23, journaled in a bearing 178, press-fitted into a boss formed on the housing part 176, with the head or enlarged portion of said driven shaft disposed in abutting relation to the end of the bearing 178, and is urged in such direction, when driven by the coupler spring 168. The inner end of the reduced portion of the shaft 165ᵇ, is formed as a pinion 179, which meshes with a gear 180. The gear, 180, is press-fitted on a hub member 181, mounted on a horizontally extending shaft 182, supported at one end in a boss 175ᵇ, and press-fitted at its opposite end in a boss 176ᵇ, of the respective housing members 175 and 176. The outer end of the hub 181, is provided with an annular groove 181ᵃ, into which projects a retainer plate 184, secured in position by a screw 185. To assist in maintaining the plate 184, in proper position, said plate is formed with a projection 184ᵃ, adapted to seat in a recess 186, formed in the housing member 176, as clearly seen in Fig. 24 of the drawings. Thus, the hub, together with its gear 180, is confined against axial movement on the shaft 182. The opposite end of the hub 181, is reduced in diameter and snugly telescoped into the adjacent end of a clutch member 188, slidably mounted on the shaft 182. The inner end of the clutch member is formed as a pinion 189, and the extreme end thereof, is adapted to interengage with three circumferentially spaced-apart teeth 190, of a clutch plate 191, rigidly attached by means of rivets 192, to the adjacent face of the gear 180. The pinion 189, is constantly in mesh with a gear 193, journaled in retained relation on a stub shaft 194, press-fitted in a boss in the housing member 176, below the bearing 176b. Rigidly connected to the gear 193, is a pinion 195, which in turn meshes with a gear 196, which is rigidly secured on the cam shaft 162.

The shaft 162, is journaled in a bearing 176c, of the housing member 176. Supported on the inner end of the cam shaft, as clearly seen in Fig. 22 of the drawings, is a control disc 200, which serves, as will hereinafter be described, to control the extent of intermittent rotation of the cam 159, which in turn controls movement of the shoe toward and away from the roll. The disc 200, is press-fitted on, and rigidly connected to a hub 201, which in turn is splined on the extreme end of the shaft 162, so as to permit a limited amount of axial movement of the disc with said hub 201, on said shaft 162. The disc is formed with a pair of cam fingers 202, of generally arcuate formation, as seen in Fig. 25 of the drawings, and spaced apart with respect to each other, an amount corresponding to the spacing of the high and low points on the contour of the cam 159. The cam fingers 202, are adapted to be engaged alternately by a spring trip finger 204, secured in keyed relation to the end of a rock shaft 205, journaled in the housing member 176, as seen in Fig. 24 of the drawings. The opposite end of the shaft 205, projects exteriorly of the housing member 176, and has connected thereto, an arm 206, the outer end of which is connected by a rod 207, to a part of the interlocking control mechanism to be presently described. Mounted in supporting relation to the spring trip finger 204, is a plate 208, likewise keyed to the shaft 205. Normally the operating shoulder 204a, of the trip finger is disposed in spaced-apart relation to a slight rise or hump portion 208a, of the plate 208, as seen in Fig. 19 of the drawings.

The marginal edge of the cam disc 200, extends into an annular groove 188a, formed in the outer end of the clutch member 188, beyond the pinion 189. The cam disc, and through its connection, the clutch member 188, are urged to the position seen in Fig. 24 of the drawings by means of a coil spring 210, surrounding the hub 201, of the cam disc, and re-acting at one end against the inner end face of a recess or well 175d, in the housing member 175, and its opposite end seating on a collar 211, disposed against the adjacent face of the cam disc 200. Thus, the coil spring 210, in addition to exerting an axial pressure against the cam disc, also tends to urge the clutch member 188, and its pinion 189, into driving relation with the clutch plate 191.

The trip finger 204, is normally disposed in the position seen in Fig. 20 of the drawings, by means of a torsion spring 212, seated in a well 175g, in the housing member 175, with one end of said spring anchored to said housing member, and the other end engaging the plate member 208, as clearly seen in Fig. 24. Said spring serves to return the trip member and plate to the position seen in Fig. 20, after having been moved to the position seen in Fig. 25 of the drawings, by operation of the rod 207.

It will now be apparent that when the rod 207, is operated by movement to the right, as viewed in Fig. 20, it shifts the trip finger 204, to the position seen in Fig. 25 of the drawings, and at which position the finger is moved out of the path of engagement with respect to the cam fingers 202, of the cam disc, and said disc is permitted to move axially on shaft 162, to the position seen in Fig. 24 of the drawings, under influence of the coil spring 210, and simultaneously therewith, the clutch member 188, is shifted into driving engagement with the clutch plate 191. The instant that the force is removed from the rod 207, the trip finger 204, and its supporting plate 208, immediately return to the position seen in Fig. 20 of the drawings, under influence of the compression spring 212, with the outer end of the trip finger disposed in position to engage one of the cam fingers 202, causing the adjacent cam finger, during the rotation of the cam disc 200, to ride camwise upon the outer end of the trip finger, and thereby move the cam disc axially outward, as clearly seen in Fig. 22 of the drawings. Incident to such movement of the cam disc, the clutch member 188, is simultaneously disengaged from the clutch plate 191, thereby arresting rotation of the cam disc 200, the cam shaft 162, and the shoe operating cam 159, which control the movement of the shoe 16.

It is to be understood that the location of the cam fingers 202, to the cam 159, are such that each time that the rod 207, is operated to move the trip finger 204, out of engagement with one of the cam fingers 202, the driving mechanism is set into operation for rotating the shaft 162, and the cam 159, a portion of a revolution, which corresponds to the movement from, what for convenience may be designated as, a low position "E" of the cam 159, to the high position, indicated at "D" of said cam 159 and vice versa. In other words, it may be stated simply that when the trip finger 204, is disengaged, the cam 159, moves from the position seen in Fig. 7 of the drawings to the position seen in Fig. 8 of the drawings, and the next time that the trip finger 204 is disengaged, the cam 159, is moved from the position seen in Fig. 8 of the drawings to the position seen in Fig. 7 of the drawings. As above stated, the position of the cam in Fig. 7 of the drawings corresponds to a condition wherein the shoe is backed away or out of engagement with the roll 12, while Fig. 8 of the drawings represents a condition of the parts with the shoe disposed in cooperative pressure engagement with the roll.

Rigidly mounted on the outer end of the cam shaft 162, is a timing disc 215, of generally circular contour, provided with a single relatively deep marginal notch 216, which is disposed in close proximity to axial alignment with the low point "E" of cam 159. Cooperating with the timing disc 215, is an interlocking control lever 218, pivotally mounted on a stud 219, carried by a bracket 220, fixedly secured to the adjacent end wall of the housing member 176, by means of screws 221. The control lever has one end positioned immediately below and in contact with the periphery of the timing disc 215, and is provided with a notch 218a, to one side of which is formed an angular detent 222, adapted in certain angular positions of adjustment of the member 218 to register with and seat in the notch 216, of the timing disc, as seen in Fig. 15 of the drawings. The interlocking lever member 218, is preferably formed of spring metal, and is normally disposed as seen in Fig. 13 of the drawings, exerting a slight upward pressure on the periphery of the timing disc 215. The opposite edge of the member 218, adjacent detent 222, is formed with an upstanding stop lug 225, adapted, when the member 218 is in the position as seen in Fig. 10 of the drawings, to engage the adjacent face of the timing disc 215, to limit the angular or pivotal movement of the interlocking lever member 218, in counterclockwise direction, as viewed in Figs. 10, 11, 12, and 13 of the drawings. A supporting lever 230, is pivotally mounted on the stud 219, and has its outer end connected to a control rod 231, the opposite end of which rod is connected to the depending member 108, associated with the knee operating control member 112, as seen in Fig. 16 of the drawings. The rearward portion of the member 218, is provided with a depending lug 218$^b$, which is connected by a coil spring 233, to an upstanding lug 230$^a$, of the supporting plate 230, tending to maintain the control lever 218, and the supporting plate 230, in approximately straight line relation to each other, such as seen in Fig. 11 of the drawings.

The purpose in making control lever 218, of spring metal, is to insure against possible breakage, which might occur if the lever were rigid, and the cam 159 and timing disc 215, rotate when the detent 222, of said lever 218, is in registration with the notch 216, of said timing disc.

Mounted beneath the supporting plate 230, is a trip member 235, also connected to the operating rod 231, at one end, the opposite end being provided with an upstanding stud 236, on which is mounted a roller 237, adapted to be disposed in and follow the contour of a cam slot indicated at 238, formed in the supporting plate 220, as seen in Figs. 11 and 13 of the drawings. The opposite end of the stud is provided with an enlarged washer 240, overlapping the cam slot and engaging the upper surface of the plate 220, to support the roller in proper relation in the cam slot 238, as well as supporting said end of the trip member 235. The trip member 235, is provided with a depending lug 235$^a$, to which is anchored one end of a coil spring 242, the opposite end of which spring is anchored to a depending lug 230$^c$, of the supporting plate 230. This spring connection serves to maintain the roller 237 in yielding engagement with the cam surface of the slot 238, and causes the roller to follow the contour of such surface during the movement of the trip member 235, as may be seen in Figs. 10, 11, 12, and 13 of the drawings.

Also mounted on the pivot pin 219, is a trip lever 245, which includes a leg portion 245$^a$, slidably mounted on the rod 207, and normally disposed in abutting relation to a nut 207$^a$, on the outer end of said rod. Said trip member also includes an upstanding lug 245$^b$, projecting through an aperture 220$^b$ in the supporting plate 220, and adapted to abut against an edge of the opening as seen in Fig. 10 of the drawings, for limiting the position of the trip lever 245, in one direction of movement. The trip lever also includes an arm 245$^c$, provided with a depending lug 245$^d$, adapted in the position seen in Fig. 11 to engage the depending lug 235$^a$, of the member 235.

The control lever 218, supporting lever 230, and the trip lever 245, are held in assembled relation, against the bracket 220, on the pivot pin 219, by a coil spring 219$^a$. The spring surrounds a sleeve 219$^b$, on the pin, and abuts at one end against the underside of the control lever 218, and at the other end against a washer 219$^c$, abutting the end of the sleeve, and the parts are held in such assembled relation by a spring clip 219$^d$, as seen in Figs. 14 and 16 of the drawings.

As above described, when the rod 207, is pulled, for example, from the position seen in Fig. 10 of the drawings, to the position seen in Fig. 12 of the drawings, the trip finger 204, is disengaged, and the motor power is then coupled with the clutch 188, for driving the cam shaft 162, and the cam 159, as above described, and which, as clearly above stated, completes a partial revolution each time the trip finger 204, is disengaged. The design of the parts is such, that during two successive actions of the trip finger, the cam 159, completes a single revolution.

Operation

The interlocking control mechanism between the drives for the roll and the shoe respectively, assumes several different positions of adjustment during the cycle of operation of the machine. When the knee control member 112, is in the dotted line position indicated at "A," the drive mechanisms for both the roll and shoe are in inoperative position, and at which position the shoe is either in pressure engagement with the roll, or is disposed out of engagement with the roll. If we assume that the shoe is away from the roll, and the knee control lever 112, is moved from the position indicated at "A" to the position indicated at "B" in Fig. 1, the interlocking control mechanism first assumes the position as seen in Fig. 12 of the drawings, and finally assumes the position seen in Fig. 13 of the drawings. When pressure on the knee control 112, is then relieved so as to permit said member 112 to assume again the position "A," the interlocking control mechanism acquires a position as seen in Fig. 11 of the drawings, during which movement, the rod 207 is operated to disengage trip finger 204, and partial rotation of cam 159, is effected for moving the shoe against the roll. If pressure is additionally released on the knee control 112, so as to permit it to assume the full line position indicated at "C" in Fig. 1 of the drawings, the interlocking control mechanism then acquires the position seen in Fig. 10 of the drawings, during which movement the shoe is in engagement with the roll, and movement is transmitted to the members 108 and 106, which effects engagement of the clutch 57 of the roll driving mechanism for causing the roll to rotate.

It is to be understood that when, however, the knee control lever is held at the position indicated at "A," the roll is stationary, and the shoe is in pressure engagement therewith, so as to perform a pressing operation on articles being worked upon, whereas, when the control member 112 is permitted to move to the position seen in full lines at "C," the articles being worked upon are caused to be ironed, with the roll rotating against the face of the shoe, and the latter in pressure engagement with the roll.

Now, when the knee lever 112, is again moved to the position indicated at "A," the interlocking control mechanism during this interim assumes a position as seen in Fig. 11 of the drawings, and during the movement from position "C" to "A," the clutch for driving the roll 12, is again disengaged, and the roll arrested, and when the control member 112, is again moved from position "A" to "B," the interlocking control mechanism first assumes the position seen in Fig. 12 of the drawings, and then finally assumes the position seen in Fig. 13 of the drawings, and during this movement the mechanism for controlling cam 162, is operated to cause the shoe to be moved out of engagement with the roll. It is to be understood that the coil spring 114, normally when pressure is relieved from the knee control lever 112, will cause the lever 112 to normally assume the position indicated at "A," with the shoe out of engagement with the roll. It will further be understood that the operation of the shoe and the roll by the manipulation of the knee lever 112, may be performed in a complete cyclical manner, or may be interrupted as described, so as to perform a pressing operation when desired.

One of the important features of the interlocking mechanism is to positively preclude utilization of the motor power for simultaneously operating the roll and shoe. In other words, the roll is permitted to operate only after the shoe has already arrived in pressure engagement with the roll, and likewise, the roll is caused to be stopped prior to movement of the shoe out of engagement with the roll. By virtue of this arrangement, it is now possible to utilize a relatively small size and small power motor in a completely automatic ironing machine.

Another important feature of our improved control resides in the fact that we employ a single member to be manipulated by the operator for controlling the complete operation of the machine, that is, both the roll and the shoe. Heretofore, it has generally been necessary to utilize a main control member for performing a cyclic operation, that is, moving the shoe to the roll, and causing rotation of the roll, and for stopping the roll and moving the shoe away from the roll, and in addition, a separate manually adjustable control element for disengaging the clutch which drives the roll, in order to perform a pressing operation.

It will be understood that while we have shown in the present construction a single control in the form of a knee operated lever, manifestly, if desired, a single control member may be provided for manual manipulation.

It will also be noted that the interlocking control mechanism and power driven mechanism for actuating the shoe are of such unitary nature, that if desired, they may be omitted from the machine, and a hand operated lever provided with connections to the shoe rock shaft, for manually moving the shoe into and out of operative relation to the roll to obtain a non-automatic ironing machine. Furthermore, such parts being of a unitary nature, permit of economies in assembly and manufacture of such machines.

Although we have herein shown and described a preferred embodiment of our invention, manifestly it is capable of modification and re-arrangement of parts without departing from the spirit and scope thereof. We do not, therefore, wish to be understood as limiting this invention to the precise form herein disclosed, except as we may be so limited by the appended claims.

We claim:

1. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to one end of the motor shaft, separate driving mechanism adapted to be operably connected to the other end of the motor shaft for moving said movable element into and out of cooperative engagement with said other element, operator actuated control means for engaging said mechanisms with the motor, and means interconnecting said two driving mechanisms for precluding simultaneous operation of both of said mechanisms.

2. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to one end of the motor shaft, separate driving mechanism adapted to be operably connected to the other end of the motor shaft for moving said movable element into and out of cooperative engagement with said other element, and operator actuated means for sequentially operating said driving mechanisms.

3. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to one end of the motor shaft, separate driving mechanism adapted to be operably connected to the other end of the motor shaft for moving said movable element into and out of cooperative engagement with said other element, a fly wheel on said motor shaft, and operator actuated means for sequentially operating said driving mechanisms.

4. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to one end of the motor shaft, separate driving mechanism adapted to be operably connected to the other end of the motor shaft for moving said movable element into and out of cooperative engagement with said other element, and a single operator actuated control member for effecting sequential operation of said driving mechanisms.

5. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to one end of the motor shaft, separate driving mechanism adapted to be operably connected to the other end of the motor shaft for moving said movable element into and out of cooperative engagement with said other element, and a single operator actuated control member for effecting sequential operation of said driving mechanisms, adapted upon one actuation to first cause limited engagement of said separate driving mechanism with the motor for moving the movable element into cooperative relation to the other element, and subsequently causing engagement of said roll driving mechanism with the motor, said control member being adapted upon the next actuation to first cause disengagement of the roll driving mechanism, and subsequently causing limited engagement of said separate driving mechanism with the motor for moving the movable element out of cooperative engagement with said other element.

6. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame, and having a driving shaft, roll driving mechanism adapted to be operably connected to the motor shaft, separate driving mechanism adapted to be operably connected to the motor shaft for moving said movable element into and out of cooperative engagement with said other element, a coil spring coupling for connecting said motor shaft to one of said driving mechanisms, operator actuated control means for engaging said mechanisms with the motor, and means interconnecting said two driving mechanisms for precluding simultaneous operation of both of said mechanisms.

7. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to the motor shaft, separate driving mechanism adapted to be operably connected to the motor shaft for moving said movable element into and out of cooperative engagement with said other element, trip mechanism associated with said separate driving mechanism, means interconnecting said trip mechanism and the roll driving mechanism to preclude simultaneous operation of said driving mechanisms, and a single operator actuated control member connected to said interconnecting means.

8. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to the motor shaft, separate driving mechanism adapted to be operably connected to the motor shaft for moving said movable element into and out of cooperative engagement with said other element, trip mechanism associated with said separate driving mechanism, means interconnecting said trip mechanism and the roll driving mechanism to preclude simultaneous operation of said driving mechanisms, and a single operator actuated control member connected to said interconnecting means, said trip mechanism including means operated incident to the movement of the control member, whereby one actuation of said member first causes the trip means to effect limited engagement of said separate driving mechanism with the motor for moving the movable element into cooperative relation to the other element, and subsequently causing engagement of said roll driving mechanism with the motor, and adapted upon the next actuation of the control member to first cause disengagement of the roll driving mechanism, and subsequently causing limited engagement of said separate driving mechanism with the motor for moving the movable element out of cooperative engagement with said other element.

9. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to the motor shaft, separate driving mechanism adapted to be operably connected to the motor shaft for moving said movable element into and out of cooperative engagement with said other element, trip mechanism associated with said separate driving mechanism, means interconnecting said trip mechanism and the roll driving mechanism to preclude simultaneous operation of said driving mechanisms, and a depending, laterally movable, knee operated control member carried on the frame and operably connected to said interconnecting means for controlling the operation of both of said driving mechanisms.

10. In an ironing machine, the combination of a supporting frame, a rotary roll element, supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to the motor shaft, separate driving mechanism adapted to be operably connected to the motor shaft for moving said movable element into and out of cooperative engagement with said other element, trip mechanism associated with said separate driving mechanism, means interconnecting said trip mechanism and the roll driving mechanism to preclude simultaneous operation of said driving mechanisms, and a depending, laterally movable, knee operated control member carried on the frame and operably connected to said interconnecting means for controlling the operation of both of said driving mechanisms, said trip mechanism including means, whereby movement of said knee operated member from a starting position to a lateral position of adjustment and return to said starting position causes limited engagement of said separate driving mechanism for either moving the movable element into or out of cooperative engagement with the other element.

11. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to the motor shaft, separate driving mechanism adapted to be operably connected to the motor shaft for moving said movable element into and out of cooperative engagement with said other element, trip mechanism associated with said separate driving mechanism, means interconnecting said trip mechanism and the roll driving mechanism to preclude simultaneous operation of said driving mechanisms, and a depending, laterally movable, knee operated control member carried on the frame and operably connected to said interconnecting means for controlling the operation of both of said driving mechanisms, said trip mechanism including means, so that movement of said knee operated member from a starting position to a lateral position of adjustment and return to said starting position causes limited engagement of said separate driving mechanism for moving the movable element into cooperative engagement with the other element, and further movement of said knee control member in the opposite direction causes engagement of the roll driving mechanism with the motor.

12. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame and having a driving shaft, roll driving mechanism adapted to be operably connected to the motor shaft, separate driving mechanism adapted to be operably connected to the motor shaft for moving said movable element into and out of cooperative engagement with said other element, trip mechanism associated with said separate driving mechanism, means interconnecting said trip mechanism and the roll driving mechanism to preclude simultaneous operation of said driving mechanisms, and a depending, laterally movable, knee operated control member carried on the frame and operably connected to said interconnecting means for controlling the operation of both of said driving mechanisms, said trip mechanism including means, so that movement of said knee operated member from a starting position to a lateral position of adjustment and return to said starting position causes limited engagement of said separate driving mechanism for moving the movable element into cooperative engagement with the other element, and further movement of said knee control member in the opposite direction causes engagement of the roll driving mechanism with the motor, said interconnecting means being adapted when said knee control member is again moved to starting position to disengage said roll driving mechanism, and further movement of said control to said lateral position of adjustment and return to starting position actuates the trip mechanism to effect limited engagement of said separate driving mechanism for moving the movable element out of engagement with said other element.

13. In an ironing machine, the combination of a supporting frame, a rotary roll mounted on the frame, a shoe pivotally mounted on the frame and movable into and out of cooperative engagement with the roll, an electric motor carried on the frame and having a driving shaft, roll driving mechanism adapted to be operably connected to the motor shaft, separate driving mechanism adapted to be operably connected to the motor shaft for moving the shoe into and out of operative engagement with the roll, said separate mechanism including a rotatable cam for moving the shoe into and out of engagement with the roll, and a coaxial timing disc rotatable with said cam, tripping mechanism including a control lever co-acting with the disc for controlling operation of the tripping mechanism and said separate driving mechanism, means interconnecting the tripping mechanism and said roll driving mechanism, and a single operator actuated control member connected to said interconnecting means, said tripping mechanism serving to preclude simultaneous operation of said roll and shoe driving mechanisms in response to actuation by said control member.

14. In an ironing machine, the combination of a supporting frame, a rotary roll mounted on the frame, a shoe pivotally mounted on the frame and movable into and out of cooperative engagement with the roll, an electric motor carried on the frame and having a driving shaft, roll driving mechanism adapted to be operably connected to one end of the motor shaft, separate driving mechanism adapted to be operably connected to the other end of the motor shaft for moving the shoe into and out of operative engagement with the roll, said separate mechanism including a rotatable cam for moving the shoe into and out of engagement with the roll, and a coaxial timing disc rotatable with said cam, tripping mechanism including a control lever co-acting with the disc for controlling operation of the tripping mechanism and said separate driving mechanism, means interconnecting the tripping mechanism and said roll driving mechanism, and a single operator actuated control member connected to said interconnecting means, said tripping mechanism serving to preclude simultaneous operation of said roll and shoe driving mechanisms in response to actuation by said control member.

15. In an ironing machine, the combination of a supporting frame, a rotary roll mounted on the frame, a shoe pivotally mounted on the frame and movable into and out of cooperative engagement with the roll, an electric motor carried on the frame and having a driving shaft, roll driving mechanism adapted to be operably connected to the motor shaft, separate driving mechanism adapted to be operably connected to the motor shaft for moving the shoe into and out of operative engagement with the roll, said separate mechanism including a rotatable cam for moving the shoe into and out of engagement with the roll, and a coaxial timing disc rotatable with said cam, tripping mechanism including a control lever co-acting with the disc for controlling operation of the tripping mechanism and said separate driving mechanism, means interconnecting the tripping mechanism and said roll driving mechanism, to preclude simultaneous operation of said roll driving mechanism and shoe operating mechanism, a laterally movable, depending knee operated control lever, operably connected to said interconnecting means for sequentially engaging both of said driving mechanisms, and spring means for yieldingly urging said control member in one direction.

16. In an ironing machine, the combintaion of a supporting frame, a rotary roll mounted on the frame, a shoe pivotally mounted on the frame and movable into and out of cooperative engagement with the roll, an electric motor carried on the frame and having a driving shaft, roll driving mechanism adapted to be operably connected to one end of the motor shaft, separate driving mechanism adapted to be operably connected to the other end of the motor shaft for moving the shoe into and out of operative engagement with the roll, said separate mechanism including a rotatable cam for moving the shoe into and out of engagement with the roll, and a coaxial timing disc rotatable with said cam, tripping mechanism including a control lever co-acting with the disc for controlling operation of the tripping mechanism and said separate driving mechanism, said control lever of the tripping mechanism being of flexible material and including a projection adapted to engage in a notch of the timing disc, when aligned therewith to cause engagement of said roll driving mechanism, means interconnecting the tripping mechanism and said roll driving mechanism, and a single operator actuated control member connected to said interconnecting means, said tripping mechanism serving to preclude simultaneous operation of said roll and shoe driving mechanisms in response to actuation by said control member.

17. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame, roll driving mechanism adapted to be operably connected to the motor, separate driving mechanism adapted to be operably connected to the motor for moving the movable element into and out of cooperative engagement with the other element, a single operator actuated control member, and means interconnecting said control member to said roll driving mechanism and said separate driving mechanism for sequentially operating said mechanisms, whereby in response to one actuation of said member the movable element is caused to be moved into cooperative engagement with the other element and the roll caused to rotate, and in response to another actuation of said member the movable element is caused to be disposed in cooperative engagement with the other element and the roll remaining stopped, and in response to still another actuation of said member, the roll is caused to be stopped, or remains stopped, depending upon previous condition of said roll, and the movable element is caused to be moved out of cooperative engagement with the other element.

18. In an ironing machine, the combination of a supporting frame, a rotary roll element supported on the frame, a cooperating shoe element supported on the frame, one of said elements being mounted for lateral bodily movement into and out of cooperative engagement with the other element, an electric motor on the frame, roll driving mechanism adapted to be operably connected to the motor, separate driving mechanism adapted to be operably connected to the motor for moving the movable element into and out of cooperative engagement with the other element, means interconnecting said two driving mechanisms for precluding simultaneous operation of said mechanisms, and a single operator actuated control member connected to said interconnecting means, whereby in response to one actuation of said member the movable element is caused to be moved into cooperative engagement with the other element and the roll caused to rotate, and in response to another actuation of said member the movable element is caused to be disposed in cooperative engagement with the other element and the roll remaining stopped, and in response to still another actuation of said member, the roll is caused to be stopped or remains stopped, depending upon previous condition of said roll, and and the movable element is caused to be moved out of cooperative engagement with the other element.

19. In an ironing machine, the combination of a supporting frame, a rotary roll element supported on the frame, a cooperating shoe element mounted on the frame for movement into and out of cooperative engagement with the roll, an electric motor on the frame, roll driving mechanism adapted to be operably connected to the motor, separate driving mechanism adapted to be operably connected to the motor for moving the shoe into and out of cooperative engagement with the roll, a single operator actuated control member, and means interconnecting said control member to said roll driving mechanism and shoe moving mechanism, whereby in response to one actuation of said member the shoe is caused to be moved into cooperative engagement with the roll and the roll caused to rotate, and in response to another actuation of said member the shoe is caused to be disposed in cooperative engagement with the roll and the roll remaining stopped, and in response to still another actuation of said member the roll is caused to be stopped or remains stopped, depending upon previous condition of said roll, and the shoe is caused to be moved out of cooperative engagement with the roll.

20. In an ironing machine, the combination of a supporting frame, a rotary roll element supported on the frame, a cooperating shoe element mounted on the frame for movement into and out of cooperative engagement with the roll, an electric motor on the frame, roll driving mechanism adapted to be operably connected to the motor, separate driving mechanism adapted to be operably connected to the motor for moving the shoe into and out of cooperative engagement with the roll, means interconnecting said two driving mechanisms for precluding simultaneous operation of said mechanisms and a single operator actuated control member connected to said interconnecting means, whereby in response to one actuation of said member the shoe is caused to be moved into cooperative engagement with the roll and the roll caused to rotate, and in response to another actuation of said member the shoe is caused to be disposed in cooperative engagement with the roll and the roll remaining stopped, and in response to still another actuation of said member the roll is caused to be stopped or remains stopped, depending upon previous condition of said roll, and the shoe is caused to be moved out of cooperative engagement with the roll.

ANDREW H. GERHARDT.
THOMAS C. MAHER.